Figure 1:
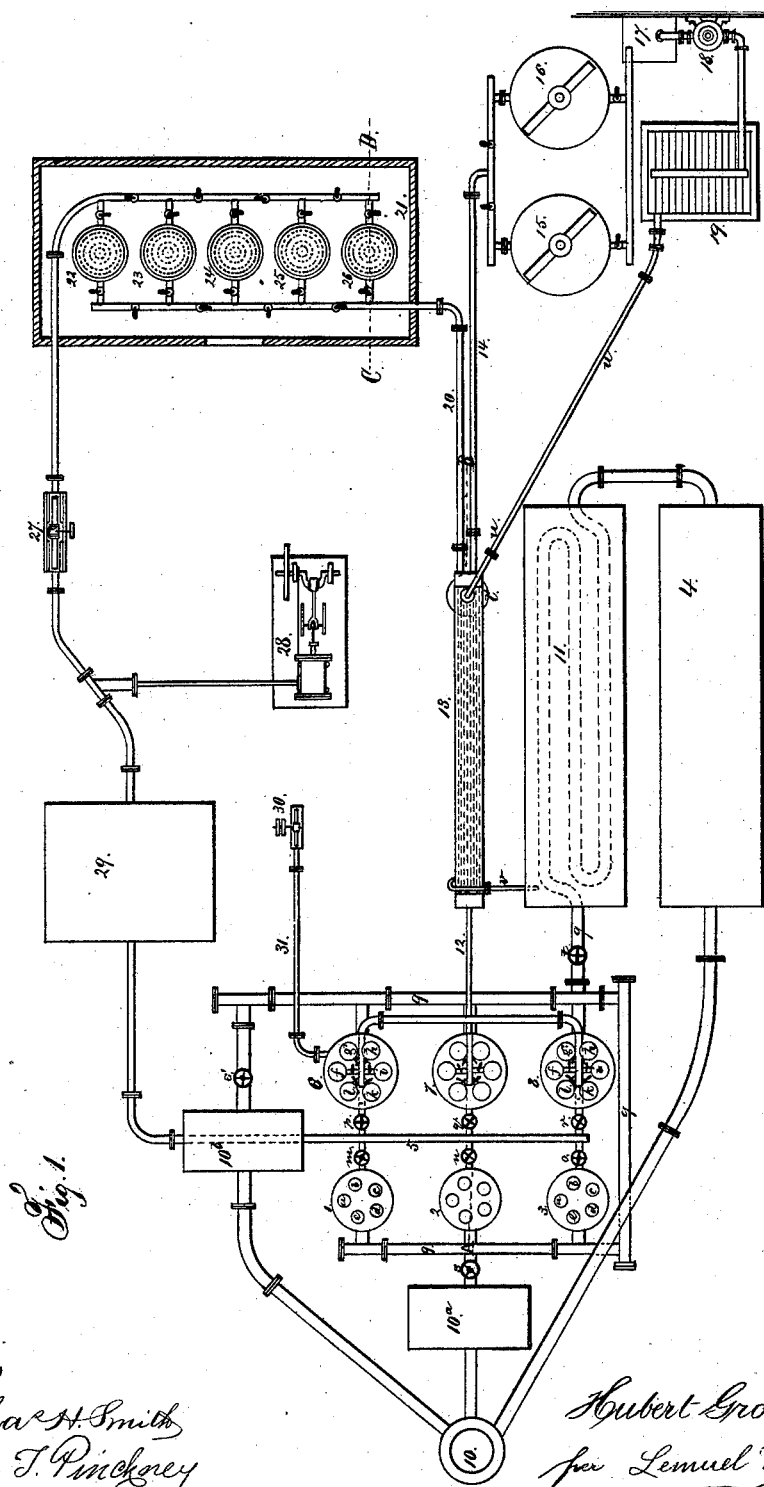

H. GROUVEN.
Manufacture of Sulphate of Ammonia.

No. 216,323. Patented June 10, 1879.

Witnesses
Chas. H. Smith
Geo. T. Pinckney

Inventor
Hubert Grouven
per Lemuel W. Serrell
atty

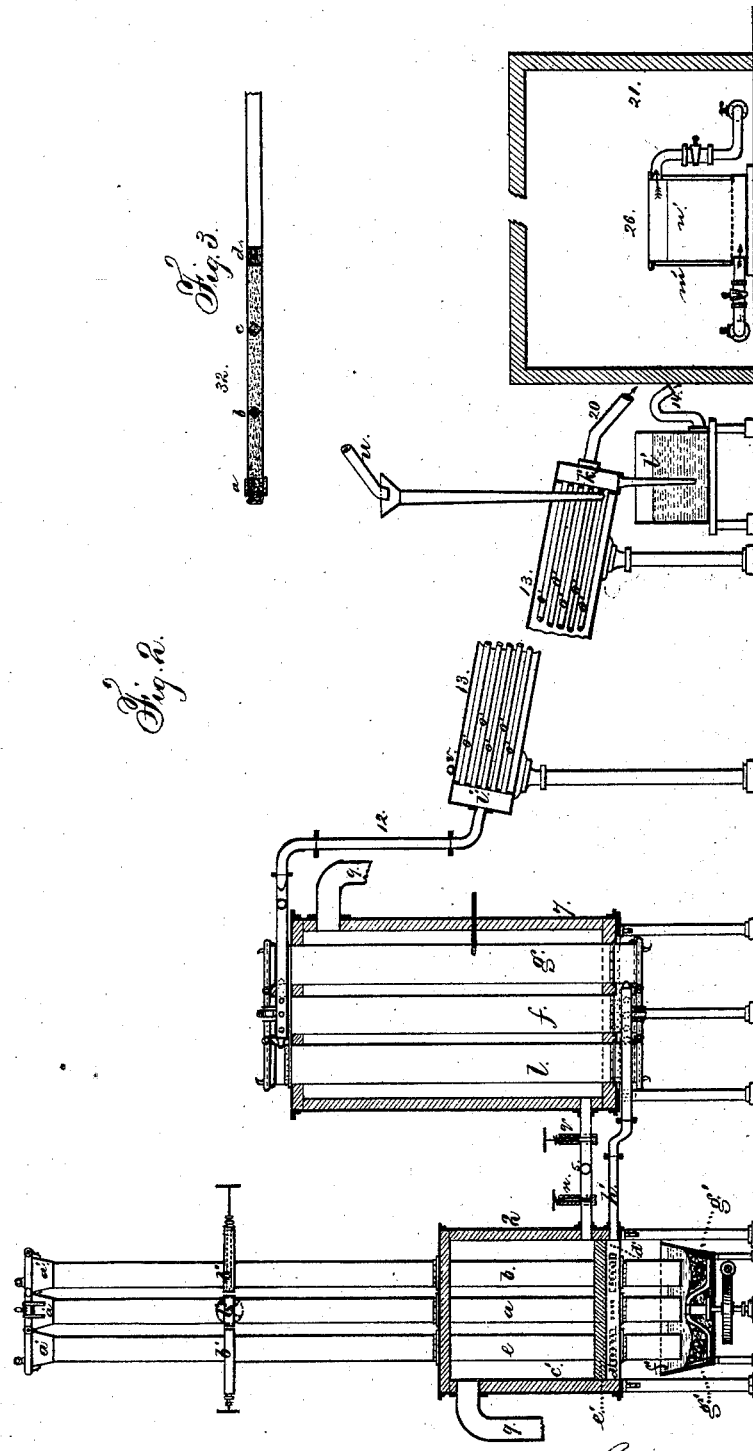

UNITED STATES PATENT OFFICE.

HUBERT GROUVEN, OF LEIPSIC, SAXONY.

IMPROVEMENT IN THE MANUFACTURE OF SULPHATE OF AMMONIA.

Specification forming part of Letters Patent No. 216,323, dated June 10, 1879; application filed May 9, 1878; patented in England, March 21, 1878.

*To all whom it may concern:*

Be it known that I, Dr. HUBERT GROUVEN, of Leipsic, Saxony, German Empire, have invented an Improvement in the Manufacture of Sulphate of Ammonia, of which the following is a specification.

The turf of marshy or meadow land and moors contains, according to my investigations, about three and eight-tenths per cent. of nitrogen. To utilize the nitrogen from the turf and form ammonia-salts is the object of my invention.

My importance of my invention becomes apparent by considering the extent and substance of the existing moors and the quantity of nitrogen they contain which is capable of being utilized as a manure.

The mode of production is divided into the following main operations, by which I am enabled to obtain about ninety-eight per cent. of the nitrogen contained in the turf: first, preparation of the excavated moor or bog for further treatment; second, the conversion of the moor or bog to ashes, steam, gas, and vapors by heat, the air being excluded; third, the decomposition of steam in the presence of the gases and vapors by means of a peculiar contact mass and at certain degrees of heat for the formation of carbonate of ammonia in gaseous form; fourth, the condensation of a part of the carbonate-of-ammonia gas; fifth, the conversion of the non-condensed carbonate-of-ammonia gas to sulphates of ammonia by the use of a peculiar chalk (sulphate of lime) in form of marbles or very small balls at certain degrees of heat; sixth, the conversion of the condensed carbonate of ammonia to sulphate of ammonia; seventh, the filtration and the evaporation of the solution of sulphate of ammonia, and the production of the dry or crystallized sulphate of ammonia.

The peat or turf is to be thoroughly ground and mixed, the same being in a properly moist condition, and about ten per cent. of fine chalk is added, and it is formed into balls about the size of the fist.

I now proceed to heat the same to 100° centigrade, so as to prevent the sulphurous contents of the turf from escaping for further treatment. The balls are placed in furnaces, which I denominate "cineriferous furnaces." The cylinders of these furnaces are in a vertical position, and receive the balls, and are hermetically closed at their upper ends. The lower ends are left open for the escape of vapors and gases as well as for the ashes; but the ashes fall into a water-reservoir, and accumulate into a pile that extends up into the furnace, so as to form a hydraulic seal against the entrance of the atmospheric air into the cylinders. The gases and vapors above this hydraulic seal are withdrawn for further treatment.

I arrange my vertical cylinders of the cineriferous furnaces in such manner that I can refill them at any time without admitting atmospheric air, and also heat them to a high temperature.

I here remark that wherever, in the course of my manufacturing, I apply heat, I derive the same from the gases developed in the cineriferous furnaces. The heat surrounding the cylinders within the cineriferous furnace must be considerable in order to cinerate the peat or turf perfectly, and to reduce the same to gas.

The gradual removal of ashes from below the cylinders is necessary in order to prevent too great an accumulation of the same into the cylinders, as the gases which I conduct into the lower part of the furnace would otherwise be required to penetrate through too thick a layer of ashes.

The gases from the cineriferous furnaces are composed of organic volatile vapors and carbureted-hydrogen gas mixed with vapors of water and hydrogen gas, carbonic oxide, (CO,) and carbonic acid, ($CO_2$.) All these gaseous substances are conducted through a highly-porous contact mass, highly heated to effect the decomposition of the watery vapors in consequence of the affinity of the carbon (C) for the oxygen of the water, whereby seven-tenths of the carbon burned produces carbonic acid and three-tenths forms oxide of carbon. Simultaneously with this process of decomposition the entire nitrogen is transformed into carbonate of ammonia. The success of this process depends upon procuring a proper contact mass of extreme porosity capable of sustaining great heat, of which I make use of a mixture of turf, pulverized chalk, and plastic clay.

The material found in northern Germany known as "meadow-chalk" I prefer to make use of on account of its purity and lightness. I prefer a fine potters' clay or plastic clay. To about fifty-two parts of dry potters' clay I add two hundred and fifty parts of water and about one hundred parts of fine chalk and about one hundred and thirty-six parts of peat or turf, the same being crushed or ground finely and thoroughly mixed together. I then make the plastic mass into the form of pipes of twenty-five millimeters internal diameter, which I proceed to dry, but without burning them. After drying, they are broken up into small pieces, and form the contact mass for filling the cylinders in my ammonium-furnace.

A characteristic feature of my contact mass is that it must contain forty-seven to fifty per cent. of lime for the full effect, and deviations of five per cent. will influence the effective action of the contact mass.

The ammonium-furnace also consists of six vertical cylinders inclosed in a furnace the size of which is in proportion to the size of the cylinders in the cineriferous furnace.

The cylinders project beyond the upper end of the furnace, so as to enable their filling with contact mass, and they likewise project at the lower end for the sake of emptying.

That part of the cylinders situated inside the furnace is surrounded by burning gases. The cylinders are furnished with grates at their lower ends, on which the contact mass rests. These grates can be turned over from the outside, so that, the cylinder being open at the bottom, the gases coming from the cineriferous furnaces will pass into the contact mass.

To insure success I sustain a certain uniform and very high degree of heat in the cylinders filled with the contact mass. I therefore establish a communication from the outside of the furnace to the interior of each separate cylinder, and I introduce a pyrometer which enables me to control the degrees of heat employed with accuracy.

In operating my ammonium-furnace it is important that atmospheric-air substances, which in extreme heats give peroxidated glowing masses containing chlorine and sulphurous compounds, be all excluded, as their presence interferes with the formation of the ammonia.

The most successful development of ammonia requires that the quantity of watery vapor be in proportion to the amount of carbon contained in the gases proceeding from the cineriferous furnaces.

I have found that the contact mass in the cylinders of the ammonium-furnaces after four to five hours' use requires a traverse of atmospheric air during a short period for removing the entire deposit of carbon from the highly-heated contact mass by means of burning off the same. This regeneration I repeat with every cylinder after four or five hours' use, and thereby I am enabled to use the contact mass for a lengthened period—say, four or five days.

For forcing the air through the contact mass for such regenerating operation I employ a second small exhauster, serving at the same time for forcing the air through the ammonium-cylinder in order to complete the newly-charged air-dried contact mass (yet containing turf mass) by burning the same in the highly-heated ammonium-cylinders.

The gas proceeding from the ammonium-furnaces now contains a mixture, the products of gasification, per fifty kilograms of anhydrous turf into 1.75 kilograms nitrogen, in form of 7.78 cubic meters ammonia-gas, ($NH_3$ of 0° centigrade,) in the midst of thirty-two cubic meters carbonic-acid gas, fourteen cubic meters carbonic-oxide gas, and eighty-eight cubic meters of hydrogen gas. This mixture is drawn by the operation of the above-named large exhauster into a refrigerating apparatus, in which the gas traverses a series of parallel pipes which are surrounded by a cooling-fluid.

My object is hereby to condense the carbonated ammonia to about two-thirds of its entire volume.

The product of condensation flows off as a clear colorless fluid from the refrigerator at 35–41° centigrade, the air being excluded.

The cooling-liquid I make use of is the sulphate of ammonia produced, as will be hereinafter explained, which enters the refrigerator at the exit end of the condensed fluid, and leaves the same at the opposite end, its temperature being now considerably raised in order to flow from thence to the crystallizing-pans.

After passing the refrigerator two-thirds of the carbonate of ammonia is condensed to a diluted solution in the refrigerator and flows off to the gypsum-digesting vessels, and is converted into sulphate of ammonia, and the remaining third gaseous carbonate of ammonia, following the action of the exhauster, is conducted to a chamber, where it receives the following treatment:

The carbonate of ammonia, being thus free from tar, admits of the employment of gypsum for conversion into sulphate of ammonia. I have found that gypsum in form, quantity, and temperature, as I shall proceed to describe the same, proves to be the best medium of absorption for converting the carbonate of ammonia to sulphate of ammonia, the difference in price of gypsum and sulphuric acid constituting an important point. In order to attain the form for such gypsum suitable for my purposes, I mix sixty kilograms of burnt gypsum (stucco gypsum) with forty kilograms of powdered chalk. I gradually add forty liters of water of 15° to 20° centigrade through a rose, whence by hydration the gypsum mixed with chalk will be transformed to small marbles.

These marbles or small balls or bullets of chalk and gypsum weigh 660 to 670 grams per liter. On being dried at 300° their loss of weight will vary between thirty-two and thirty-three per cent. These marbles constitute a filling with so many intermediate spaces and of so porous a nature that even in columns of five meters in height no actual resistance will be met with for the passage of the gas. If gypsum balls are used without an addition of chalk in the cylinders, and subjected to the carbonated ammoniacal gases, they are soon soaked and coated with a slimy solution of sulphate of ammonia, which not only chokes the passage of the gas, but also prevents the gas from penetrating into the interior of the balls.

With my gypsum and chalk marbles I use seven times the bulk of marbles in proportion to the amount of gas passing through per second, and obtain the perfect absorption of the ammonia. Much will also depend upon the temperature of the gypsum-chalk marbles, and I have found 35°–40° centigrade of heat the best, which must be maintained, this being the temperature of the ammonia-gas issuing from the refrigerator. I therefore erect the entire absorbing apparatus in a separate chamber, in which I permanently maintain the said temperature.

The apparatus consists of a set of cylinders, having internal cylinders, which fill up the outer cylinders, with the exception of a space in the lower part of the same, into which the gas enters. The internal cylinders are supplied with sieve-like bottoms, and are completely filled with chalk-gypsum marbles. Their cubic contents are calculated in such manner that every particle of gas, on passing through all the cylinders, will be in contact and acted upon by the marbles nearly during five seconds.

The carbonate of ammonia is converted into sulphate of ammonia, carbonate of lime being formed. The filling of chalk-gypsum marbles saturated with sulphate of ammonia is now removed and added to the carbonate of ammonia gained in the refrigerator in the gypsum-digesting vessels. Here the conversion of the carbonate of ammonia into sulphate of ammonia is effected, an extra quantity of stucco gypsum being added during agitation, for the first half-hour a temperature of 35° to 40° centigrade being maintained throughout.

The digesting-vessels may, to quicken the process, be supplied with agitators driven by mechanical power. The general result is a solution of sulphate of ammonia of eighteen per cent. I then suffer the contents of the digesting-vessels to settle, and decant the clear sulphate of ammonia. I liberate the sediment of the digesting-vessels of its ammonia solution by means of filter-presses. The cakes of the filter-presses may be used for the manufacturing of gypsum chalk marbles. The solution will only require to be evaporated for crystallization.

Figure 1 shows a general ground plan of my complete apparatus, adapted to operate in twenty-four hours upon twenty thousand five hundred kilograms of dry turf substance, together with forty-two thousand five hundred kilograms of water requisite therefor, so as to produce in the time stated three thousand five hundred kilograms of sulphate of ammonia; and Fig. 2 is a section in larger size.

1 2 3 are the cineriferous furnaces, the cylinders of which, $a\ b\ c\ d\ e$, are filled with turf mass mixed with chalk previously heated to the required temperature on the preheater 4.

The necessary burning gases for heating the furnaces are brought by the pipe 5, and the induction of these gases into the cineriferous furnaces is regulated by valves $m\ n\ o$. The generated gases coming from the lower portion of the cineriferous furnaces, the more particular arrangement of which is visible on Fig. 2, enter the lower parts of the cylinders $f\ g\ h\ k\ l$ of the ammonium-furnaces 6 7 8.

Each ammonium-furnace contains six cylinders, of which five are regularly filled with the contact mass in a state of extreme heat, and through which the gases and vapors from the cineriferous furnaces are perpetually streaming, whereas the sixth cylinder is always excluded from the circuit on account of refilling with contact mass.

The burning gas is conducted from the pipe 5, through the valves $p\ q\ r$, to the ammonium-furnaces, whereas the pipes 9 serve to educt the burnt gases from the cineriferous and ammonium-furnaces.

The pipes 9 either conduct the heated products of combustion, through the valve $s$, to the regenerator $10^a$ for heating the air required for burning the gases in the cineriferous and ammonium furnaces, and, through the valve $s'$, to the regenerator $10^b$ for heating the burning gases before they enter the cineriferous or ammonium furnaces, or the products of combustion are conducted through the valve $t$ underneath the crystallizing-pan 11 and preheating-pan 4 for delivering their heat, from whence they escape to the chimney 10.

By regulating the valves $s\ s'$ and $t$, I can effect the distribution of the products of combustion from the cineriferous and ammonium furnaces for the simultaneous treble application mentioned.

Pipe 12 from the cylinders of the ammonium-furnaces 6 7 8 conducts the gaseous products of the ammonium-furnaces, more particularly the carbonate of ammonia formed therein, to the refrigerator 13, in which the gases traverse a series of parallel pipes, while the pipes within an embracing-pipe are surrounded by a cooling-fluid entering through $u$ and discharging through $v$, thus traversing the cooling apparatus in an opposite direction to the gas.

In the gas-pipes of the refrigerator two-thirds of the gaseous carbonate of ammonia is condensed, these parts flowing off from the interior of the refrigerator as a clear liquid solution of carbonate of ammonia. The air is excluded, and the liquid runs by the pipe 14 to the gypsum-digesters 15 and 16, which are supplied with agitators. In these digesters the conversion of the carbonate of ammonia, by means of stucco or gypsum, to sulphate of ammonia is effected, the material being agitated all the while.

I apply the two digesters 15 and 16 so as to work them alternately. From the digesters the fluid mass is let into a reservoir, 17, from which the pump 18 forces it into the filter 19. By placing the latter in a high position, I am enabled to let the filtered fluid sulphate of ammonia flow through pipe $u$, as refrigerating-fluid, into the refrigerator 13, from whence it will make its reappearance at $v$ in a warm state, and flow from there in direct course to the crystallizing-pan 11, in which it is evaporated, in order to gain the sulphate of ammonia in form of small crystals.

Such parts of the gases and vapors as contain the carbonate-of-ammonia gas not condensed in the refrigerator are conducted through pipe 20 into the chamber 21, which is continually at 35° to 40° centigrade heat. In this chamber are the chalk-gypsum-marble cylinders 22 23 24 25 26. The combination of the pipes is again of such a nature in this case that any of the gypsum cylinders can be struck out of the conduit, so as to admit of emptying and replenishing. In this cylinder the last part of the carbonate-of-ammonia gas is absorbed by the chalk-gypsum balls, while the gas pervades all the cylinders.

The contents of the cylinders having been converted into sulphate of ammonia, they are emptied into the digesters 15 and 16, and the so-formed fluid is forced from here the same as the fluid derived from pipe 14, through the filter-press 19, to flow as cooling-fluid for the refrigerator 13 to the crystallizing-pan 11, for evaporation and formation of crystals.

While the sulphate of ammonia is flowing into the crystallizing-pan I add sulphuric acid in such very small quantities (by means of any known distributing apparatus) that by its effect such minor portions of caustic ammonia which have not been converted to sulphate of ammonia in the gypsum-digesters will be neutralized. I have found that this caustic ammonia will represent one to two per cent. of the produced sulphate of ammonia. This will determine the amount of sulphuric acid to be added with a small surplus of the latter, for economical reasons, sulphuric acid being less expensive than the evaporation of the caustic ammonia.

Having now described my mode of production of sulphate of ammonia from turf mass, it remains to notice the exhauster 27, which propels the gaseous carbonate of ammonia from the chalk-gypsum cylinders.

By means of this exhauster the propelling of the gases and vapors from the cineriferous furnaces through the ammonium-furnaces, through the refrigerator, and through the chalk-gypsum cylinders has been effected, during which onward motion the separation of the carbonate of ammonia, as described hereinbefore, has taken place.

The gases thus propelled by the exhauster are now employed to drive a gas-engine, designed at 28 in the ground-plan, Fig. 1, to drive the exhauster 27, the filter-press pump 18, the agitators in the gypsum-digesters 15 and 16, the ashes-agitator in the reservoir underneath the cineriferous furnace, the small exhauster 30, a drain-pipe press, elevators, water-pumps, and all such apparatus which may be in need of motive power, during the production of sulphate of ammonia.

I reserve to myself for the better realization, purifying, and accumulation of the gas liberated from the carbonate of ammonia to introduce at any point of the gas-conduct such well-known apparatus as may appear desirable for such purpose.

At 29 I have arranged for the introduction of a drain-pipe press for preparing the contact mass for the ammonium-furnaces, as described.

Lastly, the burning-gases in pipe 5 having been heated in suitable regenerators at $10^b$ arrive at the cineriferous and ammonium furnaces, in order to be distributed in them with the assistance of the valves $m\ n\ o\ p\ q\ r$, where they are burned, the air required therefor having been supplied and heated in the regenerator $10^a$.

Fig. 2 is a longitudinal section at line A B, Fig. 1, of a cineriferous furnace, an ammonium-furnace, and the refrigerator, and at the line C D of the chamber with a chalk-gypsum cylinder.

The cylinders of the cineriferous furnaces are closed at their upper ends at $a'$ by covers, on opening which I apply hoppers for filling in the turf mass.

On filling the cylinders that part of them inside the furnace is secured against the entrance of air by the slides $b'$.

After filling the upper parts of the cylinder, and closing the covers $a'$, I am enabled to admit the moor mass to the lower parts of the cylinders by opening the slides $b'$. The cylinders are also supplied with safety-valves at convenient places.

The gas-accumulation space $d'$ is separated from the heating-chamber $c'$ by a horizontal partition, $e'$, the gases flowing into the space $d'$ from the cylinders through openings in the peripheries of the hollow rings around the cylinders.

The ashes arising from burning of the turf mass fills the lower part of the cylinders, which terminate underneath the space $d'$ in a reservoir, $f'$, continually filled up to a certain height with water. The cylinders are thus secured against the efflux of the gases and against the entrance of atmospheric air. In order, however, to maintain the height of the ashes at a certain standard (to which I remark that I consider a column of ashes of twenty centimeters above the exit-openings in the space $d'$ as the boundary for the free escape of the gases and vapors from the cylinders of the cineriferous furnace) I supply the reservoir with an agitator, $g'$, which by its slow rotatory movement, will effect the regular removal of the base of the column of ashes under the cylinders, thus furnishing space for ashes newly formed in the cylinders.

It is important that the length of the cylinders below the space $d'$ be sufficient to prevent the ashes in that part of the cylinders adjacent to the space $d'$ becoming moist by absorbing the water from the reservoir. This is important for the free efflux of the gases and vapors from the cylinders of the cineriferous furnace.

The gases and vapors pass from the space $d'$, through pipe $h'$, to the lower part of the ammonium-furnaces, the cylinders of which are filled with contact mass. Each cylinder is connected with the pipe $h'$ by means of a branch conduit capable of being shut off.

The cylinders of the ammonium-furnaces are supplied with covers at top and bottom for letting off the old and supplying new contact mass. This mass rests on sieve-like bottoms, which are removable, so as to enable the letting off of the contact mass. Between this sieve and the cylinder-bottom the gases and vapors enter the cylinders and pass in an upward direction, and then are conveyed away laterally to enter the refrigerator 13 through pipe 12.

From the ante-chamber $i'$ the gases and vapors are distributed in the same pipe $o'$, and the uncondensed gases pass on from the chamber K, through the pipe 20, to the cylinder containing chalk-gypsum marbles. The condensed fluid runs into the vessel $l'$ and flows (the air being shut off) through the siphon-pipe 14 to the gypsum-digesters.

The chalk-gypsum-marble holder consists of a cylinder, $n'$, within the cylinder $m'$, with a sieve-like bottom, and the gases enter the same in the direction of the arrows, below the sieve-bottom, and pass through the chalk gypsum in the cylinders, and leave at their upper end in the direction of the arrow.

The internal cylinder, $n'$, firmly closed at its top, can easily be removed from the cylinder $m'$ for empting and replenishing.

For the pyrometer, which I have illustrated in Fig. 3, I make use of three alloys—viz., first, seventy-two grains copper, with twenty-eight grains pure antimony; second, seventy-five grains copper, with twenty-five grains pure antimony; third, eighty grains copper, with twenty grains pure antimony.

I thus obtain three alloys, which, after cooling, remain tolerably brittle, and are easily fractured on an anvil to sharp-edged pieces of three to five grains weight. I employ a porcelain tube of about seventeen millimeters internal diameter and of about one meter length, which I close at one end with a stopper, $a$, Fig. 3. I fill in a short length of said tube with powdered charcoal, and then enter a piece at $b$ of the seventy-two per cent. alloy. After entering a further supply of charcoal powder I introduce a piece at $c$ of the seventy-five per cent. alloy, and introduce more of the charcoal powder. I apply a stopper of asbestus at $d$. This is the pyrometer for the ammonium-cylinder. The pyrometer is inserted through a tube in the external side of the furnace into the cylinder, which, for this purpose, is arranged with a corresponding opening in its lower third part. If the alloy C in the pyrometer melts, and the alloy $b$ is only affected at its edges, then the heat is in a normal state. If the heat is too low the piece $c$ remains unmelted; if too great, $b$ will also melt.

This pyrometer enables me accurately to ascertain and control the degrees of heat in the ammonium-cylinders.

I employ the same pyrometer for the cylinders of the cineriferous furnace, with this difference, that, as I require a higher temperature in this furnace, I insert a piece of the eighty per cent. alloy at C and a piece of the seventy-five per cent. alloy at $b$.

I claim as my invention—

1. The method herein specified of manufacturing sulphate of ammonia from turf and similar material, consisting in mixing the turf with chalk, driving off the vapors and gases by heat, decomposing such vapors and gases by the contact mass, converting the carbonate of ammonia to sulphate of ammonia in the presence of sulphate of lime, and purifying and crystallizing the sulphate of ammonia, substantially as set forth.

2. The combined apparatus herein set forth for manufacturing sulphate of ammonia from turf and similar material, consisting in the vertical cineriferous furnaces, the vertical ammonium-furnaces, the regenerator, the refrigerator, the gypsum-digester, the filter and evaporator, and their connecting-pipes and cocks, substantially as set forth.

Signed by me this 18th day of April, A. D. 1878.

DR. HUBERT GROUVEN.

Witnesses:
J. EDMUND THODE,
WM. WIESENHÜTTER.